3,772,310
MANUFACTURE OF 1,1'-DISUBSTITUTED-
4,4'-BIPYRIDYLIUM SALTS
John Gerard Carey, Runcorn, England, assignor to Imperial Chemical Industries Limited, London, England
No Drawing. Filed Aug. 3, 1970, Ser. No. 60,613
Claims priority, application Great Britain, Aug. 20, 1969, 41,516/69
Int. Cl. C07d 31/44
U.S. Cl. 260—295 AM                    8 Claims

ABSTRACT OF THE DISCLOSURE

A process for the manufacture of 1,1'-disubstituted-4,4'-bipyridylium salts which comprises reacting an N-substituted pyridinium salt with anions containing the structure $>P—O^-$ or $>P—S^-$ under basic conditions, and subsequently oxidising the resulting 1,1'-disubstituted-1,1'-dihydro-4,4'-bipyridyl to the corresponding 1,1'-disubstituted-4,4'-bipyridylium salt.

---

This invention relates to the manufacture of bipyridylium salts and particularly to a process for the manufacture of 1,1' - disubstituted - 4,4'-bipyridylium salts which are useful herbicides.

According to the present invention we provide a process for the preparation of 1,1'-disubstituted -4,4'-bipyridylium salts wherein each of the substituents contains up to 10 carbon atoms which comprises reacting the corresponding N-substituted pyridinium salt under basic conditions with anions containing the structure $>P—O^-$ or $>P—S^-$, and subsqeuntly oxidising the resulting interaction product.

The anions may, for example, have the formula

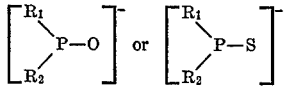

wherein $R_1$ and $R_2$ may be the same or different and each is an alkyl (for example of up to 22 carbon atoms), aryl (for example phenyl), alkaryl or aralkyl group or a group of the formula $R'O—$, $R'S—$, $R'_2N$ or $R'_2P$ wherein $R'$ is a hydrocarbon radical, for example an alkyl, aryl, alkaryl or aralkyl group and in addition $R'$ may be a hydrogen atom in the group $R'_2N—$, and wherein if each of $R_1$ and $R_2$ is a group of the formula $R'O—$, $R'S$, $R'_2N$ or $R'_2P$, then the $R'$ groups when taken together may form a cyclic structure. $R'$ is preferably a phenyl group or an alkyl group containing from 1 to 8 carbon atoms, for example an ethyl group.

In a particular embodiment of the invention, the N-substituted pyridinium salt is reacted under basic conditions with a phosphonate. Preferably, the phosphonate is one which gives rise to a phosphonate anion of the formula

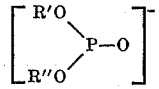

wherein $R'$ and $R''$, which may be the same or different, are alkyl groups, aryl groups or aralkyl groups or are groups which form part of a cyclic system.

A wide variety of cations may be associated with the anions; the cations conveniently may be alkali metal cations. Thus sodium or potassium salts may be employed, for example sodium or potassium dialkylphosphonate, sodium or potassium, dialkylthiophosphonates or sodium or potassium secondary phosphine oxides or phosphinites. The anions may be added in association with cations as above or they may be formed in situ if desired. Thus there may be employed compounds of phosphorus which give rise to the desired anions under the conditions of the reaction. Phosphorus itself may be employed under appropriate conditions, for example in the presence of an alkali metal hydroxide. Examples of anions which may be used are dialkyl or diaryl phosphinites and thiophosphinites and dialkyl or diaryl phosphonates and thiophosphonates, and these may be formed in situ from the corresponding dialkyl or diaryl phosphine, phosphine oxide or phosphite. The nomenclature used through this specification in respect of compounds of phosphorus is in accordance with the "Handbook for Chemical Society Authors" 1961 Special Publication No. 14 Second Edition.

The reaction can be carried out simply by mixing the reagents and heating the mixture if necessary, but we prefer to carry out the reaction in a solvent for the N-substituted pyridinium salt. We generally prefer to use aprotic solvents, particularly polar aprotic solvents, although in some cases, notably when using a phosphinite, protic solvents such as water and alcohol may be used, for example mixtures of water and ethanol. Examples of organic solvents which may be used are ethers and thioethers for example tetrahydrofuran, 1,2-dimethoxyethane, bis-(2-methoxyethyl) ether, 1,4-dioxane and thiophene; ketones, for example acetone; hydrocarbons, for example benzene, toluene, xylene and hexane; organic bases, for example pyridine; halogenated hydrocarbons and particularly chlorinated hydrocarbons, for example chlorobenzene, chloroform, carbon tetrachloride and methylene dichloride; amides, particularly tertiary alkylamides, for example dimethyl formamide; sulphoxides, for example dimethyl sulphoxide; sulphones, for example sulpholane; nitriles, for example acetonitrile; nitro compounds, for example nitropropane; and alkyl carbonates and sulphates, for example propylene carbonate and dimethyl sulphate.

Dipolar aprotic solvents, for example dimethyl formamide, dimethylsulphoxide and acetonitrile are particularly suitable solvents since their use leads to high yields of the bipyridylium salts. Mixtures of solvents may be used if desired.

The temperature at which the reaction is carried out is not critical although in some cases it is advantageous to heat the reaction mixture. In general the reaction may be carried out at a temperature from 25° C. to 120° C., preferably from 40° C. to 90° C. Temperatures above 150° C. should in general be avoided. Usually the reaction will be carried out under an inert atmosphere.

The reaction is carried out under basic conditions, preferably, but not necessarily, in the presence of an added base. If a base is used, we prefer that it be a strong base, for example an alkali metal hydride or hydroxide, or ammonia. Organic bases may be employed, for example, diazabicyclo-octane, 1,5-diazabicyclo (5,4,0) undec-5-ene, 1,5 - diazabicyclo(4,3,0) - non-5-ene, triethylamine and piperidine.

The amount of the compound of phosphorus used to provide the anions is not critical and the optimum amount depends upon the reaction conditions employed, particularly upon whether or not the reaction is carried out in the presence of an organic amine. In the case where the reaction is carried out in the absence of an organic amine we prefer to employ at least one mole of the anion containing phosphorus per mole of pyridinium cation. In the case where the reaction is carried out in the presence of an organic amine, on the other hand, the anion is regenerated so that catalytic amounts thereof are sufficient.

Any N-substituted pyridinium salt may be converted to a bipyridylium salt by the process of our invention which has an N-substituent containing up to 10 carbon atoms, and particularly suitable salts are those having an alkyl or a carbamidoalkyl substituent, and especially a methyl or a carbamidomethyl substituent, on the nitrogen atom of the pyridine nucleus. The carbamidoalkyl substituent has the formula $—R_4-CO—NR_5R_6$ wherein $R_4$ is a hydrocarbon radical, for example alkylene, (especially the methylene radical) and $R_5$ and $R_6$ are hydrocarbon or substituted hydrocarbon radicals, for example alkyl, and $R_5$ and $R_6$ may, together with the attached nitrogen atom make up a heterocyclic ring, for example an optionally substituted piperidino or morpholino group. The salt is conveniently a halide and especially a chloride salt, though the anionic species is not critical and other salts may be used, if desired. The pyridine nucleus may be substituted, for example by alkyl groups or aryl or functional groups such as carboxylic, nitrile, or carboxyaldehyde groups in the 2, 3, 5 and 6 positions, but the 4-position preferably should be unoccupied. In the case of an N-alkyl or N-carbamidoalkyl pridinium salt the alkyl group preferably contains from 1 to 4 carbon atoms.

The interaction product, a 1,1'-disubstituted-1,1'-dihydro-4,4'-bipyridyl derived from the pyridinium salt and the compound of phosphorus, is readily oxidised to the corresponding 1,1'-disubstituted-4,4'-bipyridylium salt by treatment with an oxidising agent which is an electron acceptor and has a redox potential in water more positive than —0.50 volts as compared with the saturated calomel electrode. Examples of suitable oxidising agents are ceric sulphate (in dilute sulphuric acid); metal salts, especially the halides; inorganic oxyacid anhydrides, especially sulphur dioxide; chlorine; air, preferably in conjunction with water and/or carbon dioxide and/or an acid for example acetic acid or sulphuric acid; and organic oxidising agents for example quinones such as benzoquinone, chloranil and anthraquinone. The oxidation is advantageously carried out under acidic conditions the apparent pH of the reaction mixture being preferably less than 7, especially from 4 to 6. Addition of the oxidising agent in an acidic medium is usually sufficient to achieve this result. If desired, the dihydrobipyridyl interaction product may be isolated before oxidation.

When the reaction is carried out in the presence of a polar aprotic solvent, the resulting dihydrobipyridyl may be isolated by, for example, adding water, an organic acid or a base to the reaction mixture. Acetic acid is the preferred organic acid and organic bases are the preferred bases. The base may be anhydrous or it may be employed in the form of its aqueous solution. The addition produces a slurry from which the dihydrobipyridyl may be obtained by solvent extraction or by filtration. The temperatures of the treatment may be from 0° C. to 100° C., preferably from 20° C. to 50° C.

In the case where the intermediate product is a slurry the solid can be isolated by filtration or preferably by solvent extraction. Suitable solvents for the extraction are hydrocarbons, particularly aromatic hydrocarbons and notably toluene. The temperature can be from 0° C. to 100° C. After removal of the solid there remains a portion of the intermediate reaction product in the liquid phase; this can be recovered either by oxidising it to the bipyridylium salt and isolating this salt as hereinafter described or by reducing it to form a further amount of the solid which can be isolated as described above prior to oxidising it. The reduction can be effected by any conventional reduction technique, for example using an alkali metal amalgam or a dithionite.

The product obtained as a result of the treatment is easily oxidised with a greater variety of oxidising agents than is the solution prior to the treatment. The solid obtained as a result of adding water or a base to the solution of the intermediate reaction product is a 1,1'-disubstituted-1,1'-dihydro-4,4'-bipyridyl.

1,1'-disubstituted-4,4'-bipyridylium cations conveniently may be separated from the ions of the compound of phosphorus in the reaction mixture by treating the mixture with 4,4' - diaminostilbene-2,2'-disulphonic acid which is commonly known as "amsonic acid." The bipyridylium cation is thereby precipitated from the mixture in the form of its amsonate salt whilst the ions of the phosphorus compound remain in the mixture. The precipitate can then be removed by filtration, washed and dried in conventional manner and the amsonic acid can be regenerated and recovered for re-use by acidification of the amsonate salt, preferably employing an aqueous solution of an acid. The acid used to recover the amsonic acid can be selected so as to provide the desired anion for the resulting bipyridylium salt and can be for example hydrochloric acid, phosphoric acid or acetic acid.

Amsonic acid is only sparingly soluble in water and it is therefore usually employed in the present invention in the form of an aqueous solution of one of its water-soluble salts, conveniently an alkali metal salt or the ammonium salt. The treatment of the reaction mixture with amsonic acid can be conveniently at a pH in the range 7 to 12, and at a temperature of from 0° C. to 100° C.

The 1,1'-disubstituted-4,4'-bipyridylium cations can also be separated from the anions of the phosphorus compound in the reaction mixture by contacting this mixture with a suitable cation-exchange resin. In this way the anions pass through the resin and remain in the mixture so that they are separated from the bipyridylium cation. The bipyridylium cation can subsequently be liberated from the ion-exchange resin by treatment of the resin with an acid. In this way a bipyridylium salt is obtained wherein the anion is that supplied by the acid. Examples of the anions which may be introduced into the mixture in this way are chloride, sulphate and acetate ions.

The temperature at which the mixture is contacted with the ion-exchange resin is not critical but can conveniently be from 0° C. to 100° C. Examples of suitable cation-exchange resins are the Zeocarb cation-exchange resins, for example Zeocarb 225 (SRC–8), the Amberlite cation-exchange resins for example Amberlite Resin C6–120, and the Deacidite resins.

The invention is illustrated but in no way limited by the following examples:

EXAMPLE 1

This example demonstrates the use of diphenyl phosphinite anions prepared in situ from diphenyl phosphine oxide which was itself generated in situ from a complex of diphenyl phosphine oxide and acetone.

A complex of diphenyl phosphine oxide and acetone (10.4 g.) was heated at 150° C. under vacuum (0.1 mm. Hg) until the acetone had been removed. The residue was cooled and to it was added dimethyl formamide (60 ml.) followed by sodium metal (0.9 gm.). N-methyl pyridinium chloride (1.2 g.) was then added. Stirring at 60° C. was continued for a further 3 hours after which time the mixture was cooled to room temperature and then poured into an aqueous solution of sulphur dioxide. Spectrophotometric analysis of the resulting solution indicated the presence of 6.45 g. of 1,1'-dimethyl-4,4'-bipyridylium di-cation, representing a reaction efficiency of 53% based on the N-methyl pyridinium salt fed.

EXAMPLE 2

This example illustrates the use of sodium diphenyl phosphonate.

Sodium metal (0.9 g.) was added to a stirred solution of diphenyl phosphite (10.36 g.) in dioxane (10 ml.) at 40° C. and stirring was continued until the sodium had dissolved. A solution of N-methyl pyridinium chloride (1.27 g.) in dimethyl sulphoxide (30 ml.) was then added and the mixture was stirred at 65° C. for 3 hours, after which time it was cooled and poured into an aqueous solution of sulphur dioxide. Spectrophotometric analysis of the resulting mixture showed the presence of 0.1 g. of 1,1'-dimethyl-4,4'-bipyridylium di-cation, representing a reaction efficiency of 14% with respect to N-methyl pyridinium salt fed.

EXAMPLE 3

A dispersion of sodium hydride in oil (1.44 gm. of NaH) was added to a solution of diethyl phosphite (4.14 g., 0.03 m.) in anhydrous dimethyl formamide (40 ml.)

to form sodium diethyl phosphonate. N-methyl pyridinium chloride (1.264 g.) was then added and the mixture was stirred at 75° C. for 4 hours after which time it was cooled. The resulting solution contained 1,1'-dimethyl-1,1'-dihydro-4,4'-bipyridyl (as shown by its ultraviolet spectrum peak at 400 m$\mu$ and shoulder at 374 m$\mu$.)

An aqueous solution of sulphur dioxide (100 mls.) was added to the cooled reaction mixture. The resulting solution was analysed by polarographic and spectrophotometric analysis and was shown to contain 62.8 mg. of 1,1'-dimethyl-4,4'-bipyridylium cation, representing a reaction efficiency of 6.9% with respect to N-methyl pyridinium chloride fed.

EXAMPLE 4

The procedure of Example 3 was repeated except that additional sodium hydride (1.44 g.) was added in portions to the reaction mixture over the 4 hour reaction period. The reaction efficiency was 12% with respect to N-methyl pyridinium chloride fed.

EXAMPLE 5

Sodium hydride (1.44 g.) in the form of a 50% dispersion in oil was added to a solution of diphenyl phosphite (7.02 g., 0.03 m.) in dimethyl formamide (40 ml.) and the mixture was stirred and heated to 70° C.

N-methyl pyridinium chloride (1.358 g.) was added whereupon a dark brown colouration developed. Heating at 70° C. was continued for 4 hours after which time the mixture was cooled and to it was then added an aqueous solution of sulphur dioxide. The resulting solution contained 404 mg. of 1,1'-dimethyl-4,4'-bipyridylium cation, representing a reaction efficiency of 41% with respect to N-methyl pyridinium chloride fed.

EXAMPLE 6

Sulphur (0.618 g.) was added to a solution of diphenyl phosphine (3.59 g.) in benzene (10 ml.) to form a solution of diphenyl phosphine sulphide. To this solution was added dimethyl formamide (30 ml.) and sodium hydride (0.925 g. in the form of a 50% dispersion in oil) and the resulting mixture was stirred and heated to 70° C. A solution of N-methyl pyridinium chloride (1.08 g.) in dimethyl formamide (10 ml.) was then added, and heating was continued for a further 3 hours after which time the mixture was cooled. An aqueous solution of sulphur dioxide was then added to yield a solution containing 177 mg. of 1,1'-dimethyl-4,4'-bipyridylium cation, representing a reaction efficiency of 23% with respect to N-methyl pyridinium chloride fed.

EXAMPLE 7

A solution of potassium hydroxide (1.68 g., 0.03 m.) in water (5 ml.) was added dropwise over a period of 30 minutes to a stirred slurry of yellow phosphorus (3 g.) and N-methyl pyridinium chloride (1.3 g.) in dimethyl sulphoxide (30 ml.) at 60° C. The resulting mixture was heated for a further 2½ hours after which time it was cooled and to it was added an aqueous solution of sulphur dioxide. The product was 1,1'-dimethyl-4,4'-bipyridylium cation and the reaction efficiency was 3% with respect to methyl pyridinium chloride fed.

EXAMPLE 8

N-methyl pyridinium chloride (0.01 m., 1.27 g.) was added to a stirred solution of diphenyl phosphite (0.02 m., 4.68 g.) and 1,5-diazabicyclo-(4,3,0)-non-5-ene (0.03 m., 3.7 g.) in dimethyl formamide (40 ml.) at 65° C. The colour of the solution changed from orange to dark green/brown. The ultraviolet spectrum of this solution showed strong absorptions at 400 m. and 374 m. indicating the presence of 1,1'-dimethyl-1,1'-dihydro-4,4'-bipyridyl.

After a period of 4 hours the mixture was cooled and poured into an aqueous solution of sulphur dioxide. The resulting solution was shown by polarographic and spectroscopic analysis to contain 1,1'-dimethyl-4,4'-bipyridylium cation in an amount (0.183 g.) corresponding to a reaction efficiency of 20% with respect to N-methyl pyridinium chloride fed.

EXAMPLE 9

Methyl pyridinium chloride (0.02 mole) in dimethylformamide (30 ml.) was added dropwise with stirring to a solution of sodium diethyl phosphonate (0.02 mole in 20 ml. dioxane). The mixture immediately turned yellow. After heating the mixture for 1 hour at 90° C. the mixture was cooled and cooled liquid sulphur dioxide was added.

Excess sulphur dioxide was removed from the mixture by bubbling nitrogen gas through it. The mixture was found to contain 1,1'-dimethyl-4,4'-bipyridylium ion.

EXAMPLE 10

To a stirred solution of sodium diphenyl phosphonate (prepared from 7.26 g. of diphenyl phosphite and 0.72 g. of sodium hydride) in 35 ml. of dimethyl formamide was added 1.29 g. of N-dimethylaminoacetylpyridinium chloride. The mixture was heated at 80° C. for 3 hours and turned red-brown with the deposition of a red-brown solid. The mixture was then cooled, treated with an aqueous solution of sulphur dioxide and extracted with ether. The aqueous phase was separated and shown by spectrophotometric determination of the blue radical formed on addition of sodium dithionite to a sample of the aqueous phase buffered at pH 9.2, to contain 0.94 g. of N,N'-di-(dimethylaminoacetyl)-4,4' - bipyridylium dichloride, representing a reaction efficiency of 73% based on pyridinium salt fed.

The aqueous phase was evaporated to a volume of 20 ml. and a saturated solution of ammonium amsonate was added to give a deep purple precipitate of the amsonate salt. The amsonate salt was suspended in water and treated with dilute hydrochloric acid to precipitate amsonic acid. The precipitate was removed and the aqueous solution evaporated to dryness to give a pale brown solid. Recrystallisation of this solid from ethanol yielded 0.75 g. of N,N'-di-(dimethylaminoacetyl)-4,4' - bipyridylium dichloride as white crystals which turned blue on exposure to sunlight.

EXAMPLE 11

N-methyl pyridinium chloride (1.09 g.) was added to a solution of sodium diphenyl phosphonate (prepared from 7.26 g. of diphenyl phosphite and 0.72 g. of sodium hydride) in 40 ml. of dimethyl formamide at 90° C. After 2½ hours the reaction mixture was cooled and oxidised by the addition of aqueous sulphur dioxide. The aqueous phase was found by spectrophotometric analysis to contain 0.35 g. of the 1,1'-dimethyl-4,4'-bipyridylium cation. The reaction efficiency was 44% based on N-methyl pyridinium chloride fed.

EXAMPLE 12

N-methyl pyridinium chloride (1.09 g.) was added under nitrogen to a stirred solution of sodium diphenyl phosphonate (prepared from 7.26 g. of diphenyl phosphite and 0.72 g. of sodium hydride) in 40 ml. of dimethyl formamide at 150° C. After 2½ hours the reaction mixture was cooled and oxidised by the addition of aqueous sulphur dioxide. The yield of bipyridylium ion in the aqueous phase was determined spectrophotometrically and the reaction efficiency found to be 40% based on N-methyl pyridinium chloride fed.

EXAMPLE 13

This example and Examples 14–16 illustrate the use of protic solvents.

To a slurry of diphenyl phosphine oxide (0.01 mole) and lithium hydroxide (0.8 g.) in 15 ml. of water was added a solution of N-methyl pyridinium chloride (1.35 g.) in 10 ml. of water. The mixture was stirred under nitrogen for 3 hours, cooled and oxidised by the addition of aqueous sulphur dioxide. The 1,1' - dimethyl - 4,4' - bipyridylium cation was obtained with a reaction efficiency of 3.3% based on pyridinium salt fed.

EXAMPLE 14

Diphenyl phosphine oxide acetone complex (2.6 g.) was heated under vacuo at 150° C. for 1 hour at a pressure of 1.0 mm. Hg. To the cool residue of diphenyl phosphine oxide was added a solution of N-methyl pyridinium chloride (1.35 g.) in water (10 ml.) and a solution of lithium hydroxide (0.81 g.) of monohydrate in water (10 ml.). The stirred mixture was heated to 90° C. for 3 hours, cooled and treated with aqueous sulphur dioxide.

The solution was analysed spectrophotometrically and was found to contain 0.03 g. of 1,1'-dimethyl-4,4'-bipyridylium cation, corresponding to a reaction efficiency of 3.5%.

EXAMPLE 15

To a solution of sodium ethoxide (0.02 mole) in 30 ml. of absolute ethanol was added diphenyl phosphine oxide (0.02 mole). The mixture was heated under nitrogen to 75–80° C. and treated with N-methyl pyridinium chloride (1.22 g.). After 3 hours the mixture was cooled and oxidised to give 1,1'-disubstituted-4,4'-bipyridylium ion with a reaction efficiency of 33%.

EXAMPLE 16

To a solution of diphenyl phosphine oxide acetone complex (0.02 mole) in absolute ethanol was added a solution of sodium ethoxide (0.02 mole) in ethanol (10 ml.). The mixture was heated to gentle reflux and N-methyl pyridinium chloride (1.22 g.) added. The mixture was stirred at 70° C.–80° C. for 2 hours, cooled, and oxidised by the addition of aqueous sulphur dioxide.

Analysis of the solution indicated the production of 1,1'-dimethyl pyridinium ion in an amount corresponding to a reaction efficiency of 33.0%.

What we claim is:

1. A process for the preparation of 1,1'-disubstituted-4,4'-bipyridylium salts which consists essentially of reacting at a temperature of 25° C. to 150° C. the corresponding N-substituted lower alkyl or carbamido lower alkyl pyridinium salt in the presence of an inert solvent for said salt under basic conditions with anions having the formula

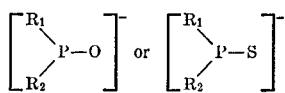

wherein $R_1$ and $R_2$ may be the same or different and each is lower alkyl; phenyl; or a group of the formula R'O—, R'S—, R'$_2$N or R'$_2$P wherein R' is hydrogen, phenyl or alkyl of 1 to 8 carbon atoms and subsequently oxidizing the resulting interaction product by treatment with an oxidizing agent which is an electron acceptor and has a redox potential in water more positive than −0.50 volts as compared with the saturated calomel electrode.

2. A process as claimed in claim 1 wherein $R_1$ and $R_2$ are groups of the formula R'O, R'S, R'$_2$N or R'$_2$P wherein R' is a phenyl group or an alkyl group containing from one to eight carbon atoms.

3. A process as claimed in claim 1 wherein the pyridinium salt reacted is the lower alkyl pyridinium salt.

4. A process as claimed in claim 1 wherein the reaction of the N-substituted pyridinium salt with the anion is carried out at a temperature of from 25° C. to 120° C.

5. A process as claimed in claim 1 wherein the reaction of the N-substituted pyridinium salt with the anion is carried out in a polar aprotic solvent.

6. A process as claimed in claim 1 wherein the interaction product is isolated before it is oxidised.

7. A process as claimed in claim 1 wherein the oxidation is carried out using sulphur dioxide as oxidising agent.

8. A process as claimed in claim 1 wherein the N-substituted pyridinium salt is reacted under basic conditions with the said phosphonate.

References Cited

UNITED STATES PATENTS 3,530,141   9/1970   Downes et al. _____ 260—296 D

OTHER REFERENCES

Karrer: Organic Chemistry, 4th English Edition, p. 928, Elsevier Pub. Co., (N.Y.) 1950.

ALAN L. ROTMAN, Primary Examiner

U.S. Cl. X.R.

260—296 D